United States Patent [19]
Arai et al.

[11] Patent Number: 6,061,527
[45] Date of Patent: May 9, 2000

[54] CAMERA

[75] Inventors: Hiroyuki Arai; Tatsuo Saito; Makoto Akiba; Minoru Takahashi, all of Omiya, Japan

[73] Assignee: Fuji Photo Optical Co., Ltd., Saitama, Japan

[21] Appl. No.: 09/275,871

[22] Filed: Mar. 25, 1999

[30] Foreign Application Priority Data

Apr. 17, 1998 [JP] Japan .................................. 10-108334

[51] Int. Cl.$^7$ .................................................. G03B 15/05
[52] U.S. Cl. ............................................ 396/159; 396/205
[58] Field of Search ..................................... 396/159–163, 396/205, 206; 315/241 P, 156, 151

[56] References Cited

U.S. PATENT DOCUMENTS 5,956,535   9/1999   Tohyama .................................. 396/159

*Primary Examiner*—W. B. Perkey
*Attorney, Agent, or Firm*—Nixon Peabody LLP; Jeffrey L. Costellia

[57] ABSTRACT

A D/A converter performs a D/A conversion on digital light quantity indication data outputted from a CPU to generate an analog light quantity indication signal. The analog light quantity indication signal thus generated is supplied to both a power supply circuit and a light quantity control circuit comprising a photometric sensor, an integration circuit, and a comparison circuit. The light quantity control circuit outputs to a flash light emission circuit a light emission stop signal at the time point when the integrated quantity of light reaches a threshold according to the light quantity indication signal.

3 Claims, 2 Drawing Sheets

CAMERA

BACKGROUND OF THE INVENTION

1. Field of the Invention

The present invention relates to a camera having an electronic flash equipment for emitting flash light of the controlled quantity of light in synchronism with a shutter operation.

2. Description of the Related Art

Hitherto, there is well known a camera having an electronic flash equipment in which in case of a shortage of the quantity of light from a camera subject, flash light of the controlled quantity of light is emitted in synchronism with a shutter operation to perform a photography.

FIG. 3 is a circuit block diagram of a camera having an electronic flash equipment according to the earlier technology.

In FIG. 3, there are shown a light quantity indication circuit 10 comprising a CPU 11 and a D/A converter 12, a power supply circuit 50, a light quantity control circuit 30 and a flash light emission circuit 40. The CPU 11 is supplied with a power-supply voltage $V_{CPU}$, and the power supply circuit 50 is supplied with a power-supply voltage $V_{DD}$.

The CPU 11 feeds to the power supply circuit 50 a power supply signal STVW for activating the light quantity control circuit 30 in a predetermined timing prior to a shutter release, for example, in timing of a shutter button half depression. The CPU 11 performs arithmetic on the quantity of light of emission of the flash light in accordance with an ISO value representative of the photographic speed and an F number representative of the stop or aperture to generate digital light quantity indication data DData, and outputs the same to the D/A converter 12.

The D/A converter 12 performs a D/A conversion on the digital light quantity indication data DData outputted from the CPU 11 to generate an analog light quantity indication signal AIND, and outputs the same to the light quantity control circuit 30.

The power supply circuit 50 comprises: a transistor 21 having an emitter connected to the power-supply voltage $V_{DD}$ and a collector connected to a power source line (not illustrated) of the light quantity control circuit 30; a resistance 22 disposed between the emitter and a base of the transistor 21; and a resistance 23 disposed between the CPU 11 and the transistor 21. The power supply circuit 50 receives the power supply signal STVW from the CPU 11 to supply to the light quantity control circuit 30 power for operating the light quantity control circuit 30.

The light quantity control circuit 30 comprises a photometric sensor 31, an integration circuit 32 and a comparison circuit 33. The photometric sensor 31 measures reflected light of flash light, which is reflected on a camera subject and is returned. The integration circuit 32 integrates the quantity of light of the reflected light measured by the photometric sensor 31. The comparison circuit 33 compares the integrated quantity of light obtained by the integration circuit 32 with a threshold according to the analog light quantity indication signal AIND generated from the D/A converter 12, and outputs a light emission stop signal STP at the time point when the integrated quantity of light reaches the threshold.

The flash light emission circuit 40 causes the electronic flash to emit light at the time point when a shutter button is entirely depressed, and upon receipt of the light emission stop signal STP, causes light emission of the electronic flash to be terminated.

With reference to FIGS. 3 and 4 there will be explained an operation for a circuit of the camera arranged in this manner.

FIG. 4 is a time chart useful for understanding operation of the circuits shown in FIG. 3.

In FIG. 4, a signal SPI varies to offer an 'H' level when a time point that a shutter button is half depressed is given as the starting point, where before the shutter button is half depressed the signal SPI offers an 'L' level. Further, before the shutter button is half depressed, the CPU 11 outputs the power supply signal STVW which offers an 'H' level. The power supply signal STVW of the 'H' level is fed via the resistance 23 to the transistor 21, and thus the transistor 21 is in a turn-off state. Consequently, no electric power is supplied from the power supply circuit 50 to the light quantity control circuit 30 and thereby contributing to the low power dissipation.

Next, in order to take a photograph of a camera subject, a shutter button is subjected to a half-depression state. As a result, a signal SP1 supplied to the CPU 11 is varied in its level from the 'L' level to the 'H' level. In response to the level change of the signal SP1 to the 'H' level, the CPU 11 changes in level the power supply signal STVW from the 'H' level to the 'L' level. The power supply signal STVW of the 'L' level is fed via the resistance 23 to the transistor 21, and thus the transistor 21 is in a turn-on state. Consequently, an electric power according to the voltage $V_{ST}$, which is obtained through subtracting a voltage drop due to a turn-on resistance of the transistor 21 from the power-supply voltage $V_{DD}$, is supplied to the light quantity control circuit 30.

Further, as mentioned above, the CPU 11 performs arithmetic on the quantity of light of emission of the electronic flash in accordance with the ISO value and the F number to generate digital light quantity indication data DData, and outputs the same to the D/A converter 12. The D/A converter 12 performs a D/A conversion on the digital light quantity indication data DData outputted from the CPU 11 to generate the analog light quantity indication signal AIND, and outputs the same to the comparison circuit 33.

In this condition, the shutter button is entirely depressed. Then, the flash light emanates in accordance with a control of the flash light emission circuit 40. Of the stroboscopic light, a part of reflected light reflected on the camera subject and returned is measured by the photometric sensor 31. The measured quantity of light is integrated by the integration circuit 32 and then fed to the comparison circuit 33. The comparison circuit 33 compares the integrated quantity of light obtained by the integration circuit 32 with a threshold according to the analog light quantity indication signal AIND generated from the D/A converter 12, and outputs the light emission stop signal STP at the time point when the integrated quantity of light reaches the threshold. The flash light emission circuit 40 causes the electronic flash to emit light at the time point when a shutter button is entirely depressed, and upon receipt of the light emission stop signal STP, causes light emission of the electronic flash to be terminated. In this manner, the flash light is controlled to perform a photography for the camera subject.

In the above-mentioned camera according to the earlier technology, there is provided such an arrangement that an electric power is not supplied at ordinary times to the light quantity control circuit for controlling the quantity of light of the flash light emission, but be supplied to the light quantity control circuit at the time point that the shutter button is half depressed, and thereby contributing to a low power dissipation. However, in order to implement the above-mentioned arrangement of the camera, there is a need to increase the output terminals of the CPU by one. This involves complicated processing in the CPU. And in addition, there is a fear that the input and output terminals of the CPU become insufficient. This is caused by a simple idea such that an extra signal (the power supply signal STVW) is added for the purpose of saving power.

SUMMARY OF THE INVENTION

In view of the foregoing, it is therefore an object of the present invention to provide a camera capable of saving power without increasing the number of signals, in other words, decreasing the number of signals as compared with the above-mentioned art according to the earlier technology.

To attain the above-mentioned object, according to the present invention, there is provided a camera having an electronic flash equipment for emitting flash light of controlled quantity of light in synchronism with a shutter operation, said camera comprising:

(1) a flash light emission circuit for receiving a predetermined light emission stop signal under control of light emission of the electronic flash to stop the light emission of the electronic flash;

(2) a light quantity indication circuit for generating an analog light quantity indication signal to control a light quantity of the light emission of the electronic flash n a predetermined timing prior to a shutter release;

(3) a light quantity control circuit for receiving the light quantity indication signal and outputting the light emission stop signal in a timing wherein the light quantity of the light emission of the electronic flash reaches the quantity of light according to the light quantity indication signal, after start of the light emission of the electronic flash; and (4) a power supply circuit for receiving the light quantity indication signal from said light quantity indication circuit to supply electric power for operating said light quantity control circuit to said light quantity control circuit.

According to the camera of the present invention, the analog light quantity indication signal to control a light quantity of the light emission of the electronic flash, which is generated in the light quantity indication circuit, is supplied to not only the light quantity control circuit, but also the power supply circuit. Electric power is supplied to the light quantity control circuit in accordance with the light quantity indication signal. Thus, according to the camera of the present invention, there is no need to prepare a signal for suppling electric power to the light quantity circuit as in the above-mentioned art according to the earlier technology, whereby a control is simplified and also a small space for wiring of signal lines on a substrate can be used.

In the above-mentioned camera, it is acceptable that said light quantity control circuit comprises: a photometric sensor for measuring reflected light of flash light, which is reflected on a camera subject and is returned; an integration circuit for integrating the quantity of light of the reflected light measured by the photometric sensor; and a comparison circuit for comparing the integrated quantity of light obtained by the integration circuit with a threshold according to the light quantity indication signal, and outputting the light emission stop signal at the time point when the integrated quantity of light reaches the threshold.

Further, in the above-mentioned camera, it is acceptable that said light quantity indication circuit comprises a CPU for performing arithmetic on the quantity of light of emission of the electronic flash to generate digital light quantity indication data, and a D/A converter for performing a D/A conversion on the digital light quantity indication data outputted from said CPU to generate an analog light quantity indication signal. In the event that the light quantity indication circuit has such CPU and D/A converter, this arrangement makes it possible to input the analog light quantity indication signal to both the power supply circuit and the light quantity control circuit, and thereby reducing the number of output terminals of the CPU by one.

DESCRIPTION OF THE PREFERRED EMBODIMENTS

Hereinafter, there will be described embodiments of the present invention.

Figure 1:
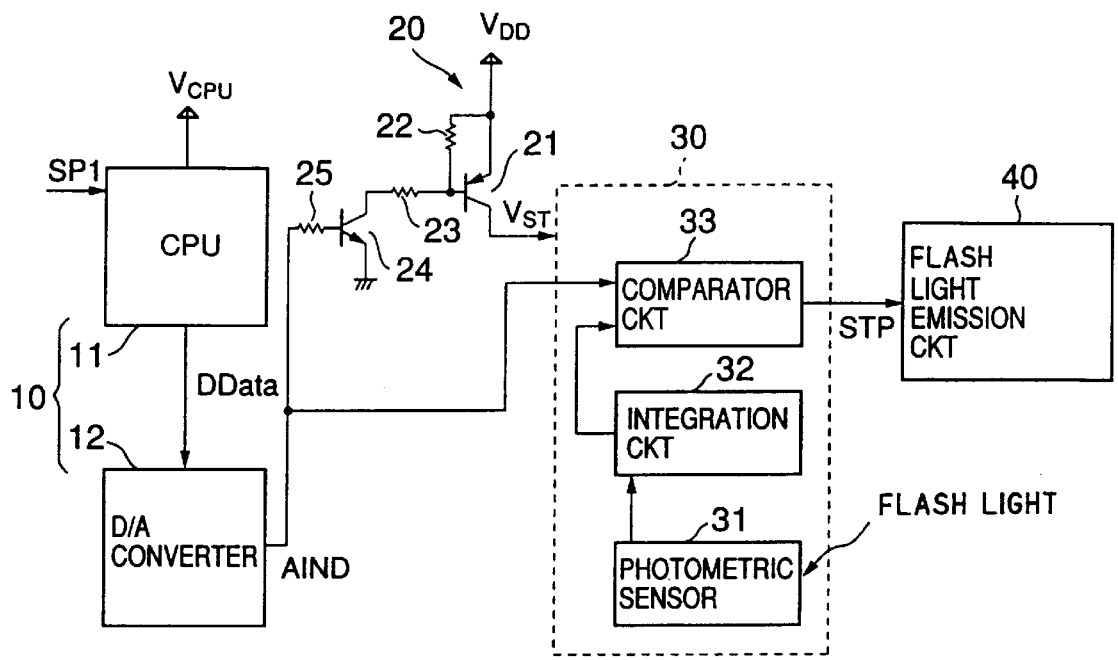
FIG. 1 is a circuit block diagram of a camera according to an embodiment of the present invention.
Figure 2:
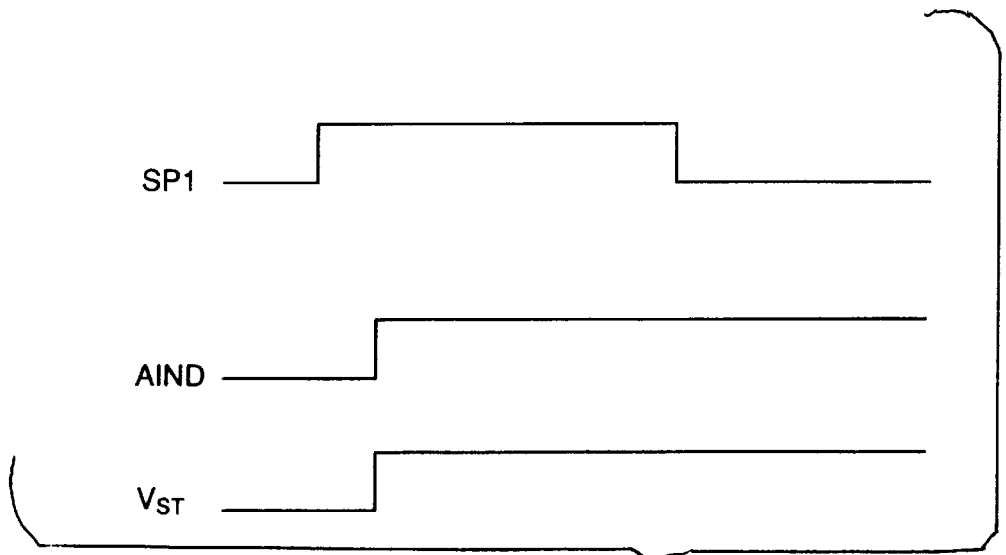
FIG. 2 is a time chart useful for understanding operation of the circuits shown in FIG. 1.

FIG. 1 is a circuit block diagram of a camera according to an embodiment of the present invention. FIG. 2 is a time chart useful for understanding operation of the circuits shown in FIG. 1.

Figure 3:
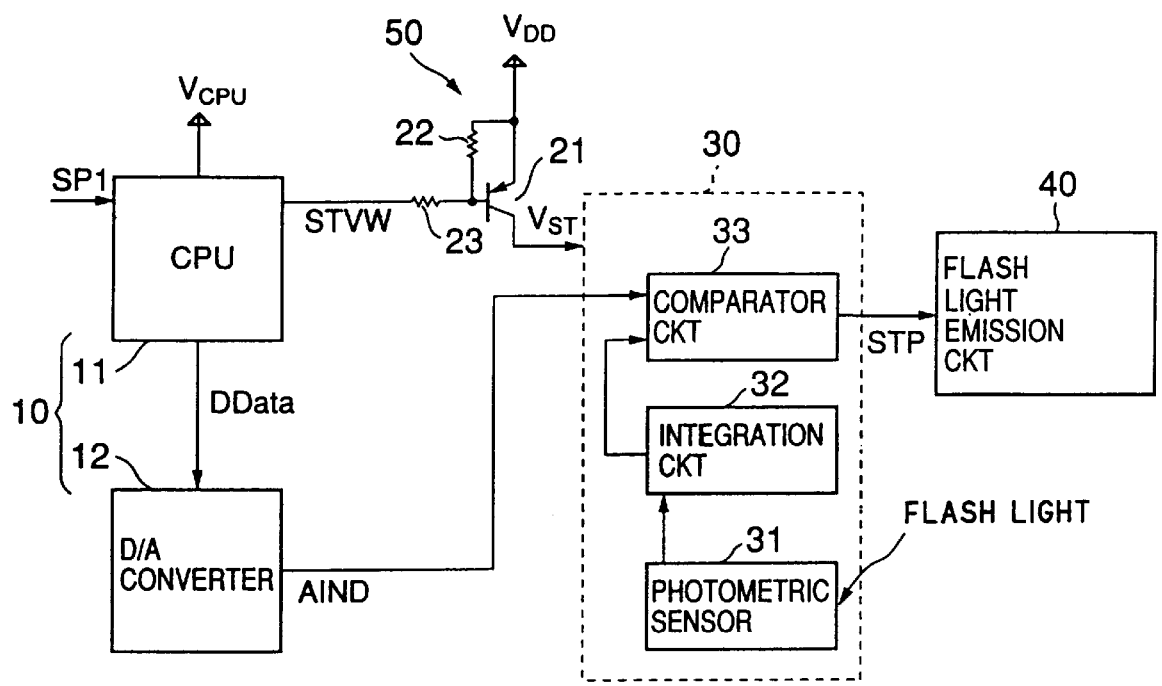
FIG. 3 is a circuit block diagram of a camera having an electronic flash equipment according to the earlier technology.
Figure 4:
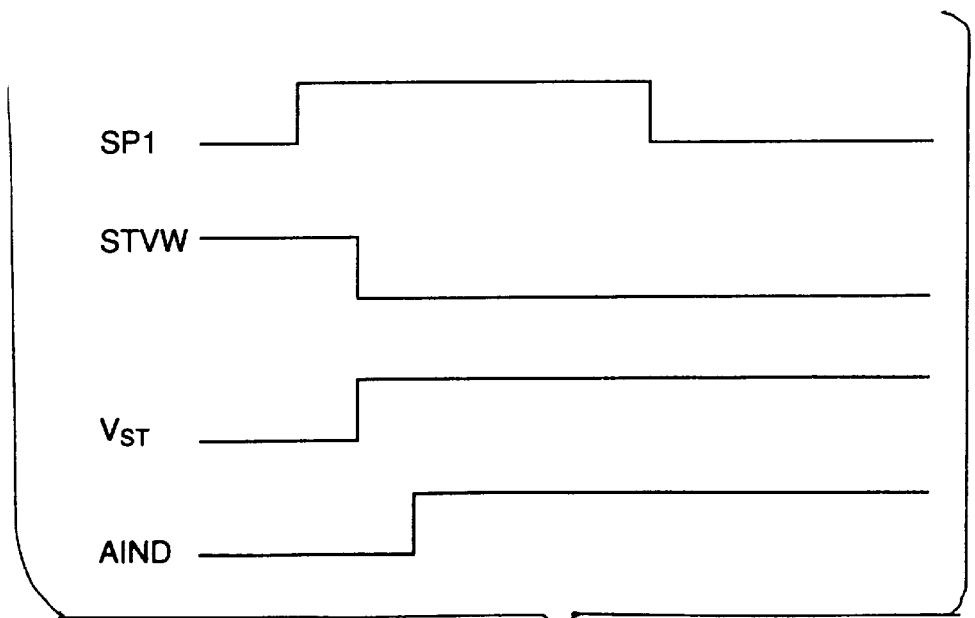
FIG. 4 is a time chart useful for understanding operation of the circuits shown in FIG. 3.

In FIG. 1, the same parts are denoted by the same reference numbers as those of FIG. 3. A redundant description will be omitted.

A power supply circuit 20 shown in FIG. 1 comprises, in addition to the structure of the power supply circuit 50 shown in FIG. 3, a transistor 24 having a collector connected to the resistance 23 and a emitter is earthed, and a resistance 25 one end of which is connected to a base of the transistor 24 and another is connected to the connection point of the output of the D/A converter 12 and the comparison circuit 33.

In order to take a photograph of a camera subject, in a timing that a shutter button is half-depressed (an example of a predetermined timing prior to a shutter release referred to in the present invention), the signal SP1 shown in FIG. 2 is varied in its level from the 'L' level to the 'H' level. In response to the level change of the signal SP1 to the 'H' level, the CPU 11 performs arithmetic on the quantity of light of emission of the electronic flash in accordance with the ISO value and the F number to generate digital light quantity indication data DData, and outputs the same to the D/A converter 12. The D/A converter 12 performs a D/A conversion on the digital light quantity indication data DData outputted from the CPU 11 to generate the analog light quantity indication signal AIND. According to the present embodiment, a voltage level of the analog light quantity indication signal AIND to be generated is set up to at least voltage with which the transistor 24 constituting the power supply circuit 20 is turned on, for example, 1 volt or more. When the analog light quantity indication signal AIND is applied through the resistance 25 to the transistor 24, the transistor 24 turns on. As a result, the base potential of the transistor 21 via the resistance 23 goes down so that the transistor 21 turns on. Consequently, an electric power according to the voltage $V_{ST}$, which is obtained through subtracting a voltage drop due to a turn-on resistance of the transistor 21 from the power-supply voltage $V_{DD}$, is supplied to the light quantity control circuit 30. As the transistor 21, a PNP type of transistor is used. An emitter of the PNP type of transistor is connected to the power-supply voltage $V_{DD}$, and thus the voltage drop due to the turn-on resistance of the transistor 21 is small.

According to the present embodiment, the analog light quantity indication signal AIND outputted from the D/A converter 12 is fed to both the power supply circuit 20 and the light quantity control circuit 30. Thus, a single analog light quantity indication signal AIND causes an electric power to be supplied from the power supply circuit 20 to the light quantity control circuit 30, and also causes a threshold defining the quantity of light of emission of the flash light to be inputted to the light quantity control circuit 30. Consequently, as compared with the camera having the circuit shown in FIG. 3 according the earlier technology, a single signal line can be used, and an area occupied by the signal line on a circuit substrate can be reduced. Further, according to the present embodiment, it is possible to omit the processing for generating the power supply signal STVW and also to omit a terminal for outputting the power supply signal STVW.

According to the present embodiment, the light quantity control circuit comprises the photometric sensor, the integration circuit and the comparison circuit. However, the present invention is not restricted to this arrangement. Any one is acceptable, as the light quantity control circuit, which has such an arrangement that the light emission stop signal STP is generated in a timing when the quantity of light of the flash light emission reaches the quantity of light according to the light quantity indication signal AIND. It is acceptable to provide such an arrangement that for example, instead of providing a feedback system for receiving reflected light of flash light, elapsed time from the light emission start timing is converted into the quantity of emitted light, and the light emission stop signal STP is generated at the time point when the quantity of emitted light reaches a predetermined value.

As mentioned above, according to the present invention, it is possible to provide a camera contributing to saving power without increasing the number of signals for saving power.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera having an electronic flash equipment for emitting flash light of controlled quantity of light in synchronism with a shutter operation, said camera comprising:

a flash light emission circuit for receiving a predetermined light emission stop signal under control of light emission of the electronic flash to stop the light emission of the electronic flash;

a light quantity indication circuit for generating an analog light quantity indication signal to control a light quantity of the light emission of the electronic flash in a predetermined timing prior to a shutter release;

a light quantity control circuit for receiving the light quantity indication signal and outputting the light emission stop signal in a timing wherein the light quantity of the light emission of the electronic flash reaches the quantity of light according to the light quantity indication signal, after start of the light emission of the electronic flash; and a power supply circuit for receiving the light quantity indication signal from said light quantity indication circuit to supply electric power for operating said light quantity control circuit to said light quantity control circuit.

2. A camera according to claim 1, wherein said light quantity control circuit comprises: a photometric sensor for measuring reflected light of flash light, which is reflected on a camera subject and is returned; an integration circuit for integrating the quantity of light of the reflected light measured by the photometric sensor; and a comparison circuit for comparing the integrated quantity of light obtained by the integration circuit with a threshold according to the light quantity indication signal, and outputting the light emission stop signal at the time point when the integrated quantity of light reaches the threshold.

3. A camera according to claim 1, wherein said light quantity indication circuit comprises a CPU for performing arithmetic on the quantity of light of emission of the electronic flash to generate digital light quantity indication data, and a D/A converter for performing a D/A conversion on the digital light quantity indication data outputted from said CPU to generate an analog light quantity indication signal.

* * * * *